Sept. 15, 1953

N. M. HAYNES

MAGNETIC TAPE RECORDER

Filed Sept. 10, 1948

2,652,204

INVENTOR.

Nathan M. Haynes

BY

S. Stephen Baker

ATTORNEY

Patented Sept. 15, 1953

2,652,204

UNITED STATES PATENT OFFICE 2,652,204

MAGNETIC TAPE RECORDER

Nathan M. Haynes, New York, N. Y.

Application September 10, 1948, Serial No. 48,690

3 Claims. (Cl. 242—54)

This invention relates to magnetic recorders and more particularly to an improvement in the mechanical design thereof.

The instant invention is particularly directed to magnetic tape recorders wherein the magnetic tape taken off a load reel is recorded upon as it winds up on a take-up reel. Such recorders are well known in the art and they include a motor drive for actuating either the load reel or the take-up reel depending upon the direction in which the tape is travelling. The reels are generally of a size which is limited by the structural dimensions of the recorder cabinet and the playing time is accordingly so limited. If the size of the reels is to be increased to provide longer playing periods, the apparatus generally becomes bulky and, therefore, undesirable. The instant invention provides an apparatus which is capable of operation over extremely long periods of time without unduly increasing the size of the apparatus whether the long playing features are in use or not. Large reels are provided which are arranged to be driven from the same driving means as actuate the conventional smaller reels. The large reels are disposed so as to be easily accessible but which are, in effect, "folded over" the cabinet so as to occupy a minimum working space.

Referring to the drawings.

Figure 1:
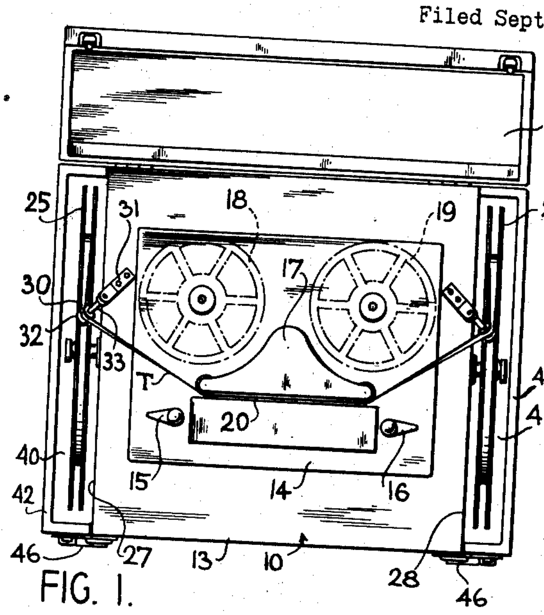
Fig. 1 is a top plan view of the improved apparatus with the cover open.

The recorder is illustrated as including a housing 10 having a hinged cover 12 and a top panel 13 which includes a top plate 14. Plate 14 bears the operating controls 15 and 16, the tape recording and reproducing housing 17, and the conventional reels 18 and 19. Reels 18 and 19 are indicated in dotted lines since they are used alternatively with the larger reels hereinafter to be described. Apart from provision and use of such larger reels, the apparatus generally operates by having tapes pass from reel 18 through the slot 20 and onto reel 19, controls 15 and 16 determining both the direction of travel and the recording or reproducing functions of the apparatus. As such, the apparatus is not the object of the instant invention, which is particularly directed to the additional features to be hereinafter described.

In order to adapt the apparatus toward longer playing operation, two large reels 25 and 26 are connected to the sides 27 and 28 of the cabinet. The large reels are disposed at a 90 degree angle in relation to the smaller reels 18 and 19 so that, in effect, the larger reels ar folded over the sides of the cabinet. Accordingly, the tape T, instead of winding around reels 18 and 19 is outwardly directed to the reels 25 and 26 and is twisted at point 30 to accommodate the vertical disposition of the larger reels. Thus, brackets 31 are provided at the respective side edges of the cabinet and extend angularly past such side edges. Guide rollers 32 are connected to arms 33 of such brackets, the rollers 33 being disposed substantially directly above the respective large reels. It will be appreciated, therefore, that the tape T is given a 90 degree twist as it winds over the larger reels.

Figure 2:
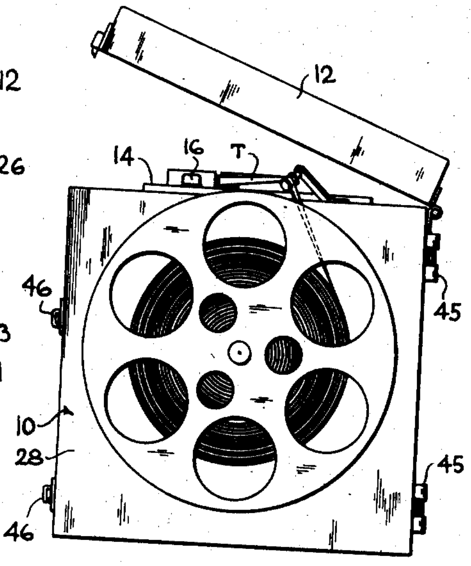
Fig. 2 is a side elevational view thereof with one end door removed.

In order to install, or permit physical access to, the reels, narrow end chambers 40 and 41 are formed having end doors 42 and 43. Such end chambers are hinged as at 45 and are locked by the catches 46. When the large reels are to be installed, the end doors are swung open on their hinges and may be completely removed, if necessary, as illustrated in Fig. 2. The end reels may thereupon be applied or removed, as required, and as will be hereinafter described.

Figure 3:
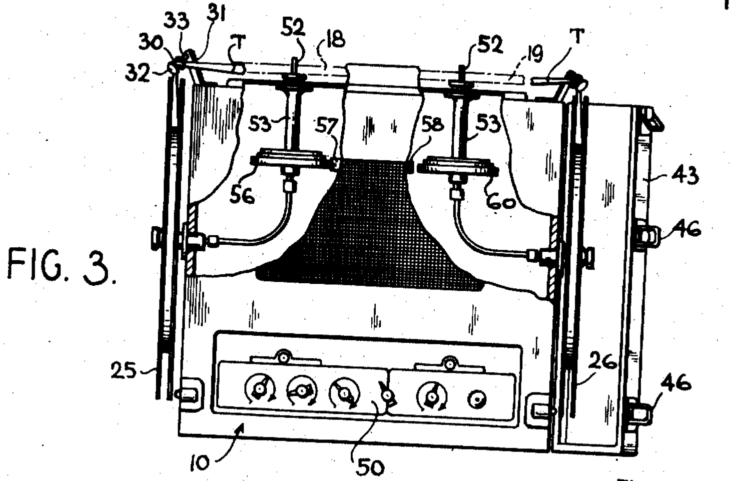
Fig. 3 is a front view of the apparatus, partly broken away, the cover and one end door being removed.

The instant invention adapts the conventional drive means for the smaller reels toward actuation of the larger reels. Therefore, a brief description of such conventional drive means will be set forth. Referring to Fig. 3, the apparatus may include an amplifier unit 50 which serves for conventional purposes. A speaker and a drive motor, not shown, provide the original source of power. Reel 18 is connected to shaft 51 (Fig. 4) through a connector 52, the shaft 51 being enclosed in a tubular housing 53. Wheel 54 is the driven wheel of a clutch mechanism so as to transmit the drive to the reel. As noted in Fig. 4, wheel 54 is provided with a flat periphery having a felt ring 55 to permit satisfactory gripping of the driven wheel. Wheel 56 transmits the drive imparted to it to the driven wheel 54. In order to provide for selective actuation of wheel 56, a small wheel 57 is arranged, through conventional mechanism, to make contact with wheel 56 and to drive the same. Wheel 56 is generally rubber covered to facilitate such frictional drive. According to the operation of controls 15 or 16, either of the wheels 57 or 58 is pressed into contact with either of the clutch driving wheels 56 or 60. Shaft 51, connector 52 and wheel 54 may be integral as may shaft 65 which extends from the other side of wheel 54.

Figure 4:
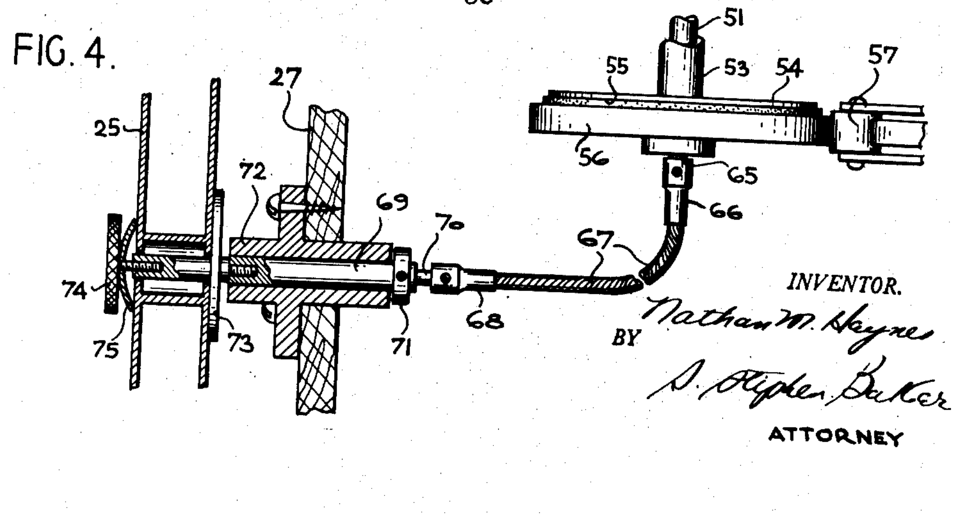
Fig. 4 is an enlarged fragmentary view of the drive elements.

The foregoing action being more or less conventional, or being one of many other mechanisms which perform similar functions, no claims are made thereto. However, the instant invention adapts such drive toward the actuation of the larger reels 25 and 26. Referring to Fig. 4, the shaft 65 is driven by wheel 56 when that wheel is itself driven. An adaptor 66 is applied over such shaft 65 so as to rotate therewith, the adaptor 66 forming the end of a flexible cable or shaft 67. A second adaptor 68 applied at the other end of the flexible shaft 67 transmits the driving power to shaft 69 through its reduced portion 70. A collar 71 serves to limit inward movement of shaft 69. Shaft 69 is rotatably received in bearing 72 which is connected to the side 27 of the cabinet. An adaptor 73 is screwed into a threaded opening of shaft 69 and serves to transmit the driving power to the reel 25. A manually operated nut 74 including a lock washer 75 prevent disengagement of such reel. It will be apparent from the foregoing that the same mechanism which drives the conventional or smaller reels is utilized to drive the larger reels. This arrangement effects substantial economies since the clutch drive above described is somewhat complex. Briefly, wheels 54 and 56 are arranged to provide the required slippage so that the reels turn at a speed which is commensurate with the radius of the tape wound thereon as will be well understood by those skilled in the art., Flexible shaft 67 is such as to permit a perpendicular transmission of driven power to accommodate the vertical disposition of the larger reels.

The operation and advantages of the apparatus will be evident from the foregoing description. Whether or not the smaller reels 18 and 19 are utilized, the apparatus will hardly consume much more space than if the larger reels were not available. Operation of the larger reels does not involve further space requirements than those shown while the end doors provided with the hinges and clasps afford easy accessibility thereto. It has been found, in fact, that the large reels may be of such size as to permit approximately 24 hour continuous operation. The means for adapting the motor drive for such larger reels involves hardly more than the use of a pair of flexible shafts and two couplings.

It will be understood from the foregoing that a recorder has been provided wherein the larger, supplementary reels may be operated when a longer playing time is required and wherein the covers or doors 42 and 43 at the sides of the rectangular cabinet form end chambers for housing such larger reels. Such end chambers are open at the top as shown in order to permit the required travel of the tape from the top or horizontal operating panel 13 to the larger reels.

While there has been described what at present is considered a preferred embodiment of the invention, it will be evident that many changes and modifications may be made therein without departing from its spirit. For example, the guide roller 32 may be replaced by two rollers which are relatively perpendicularly disposed so that the tape is twisted into correct position as it passes from one guide roller to the other. These guide rollers are generally positioned directly above the larger reels. In addition, the larger reels may be disposed in other manners than that shown. It is therefore aimed in the appended claims to cover all such changes and modifications which fall within the true spirit and scope of the invention.

What is claimed is:

1. In a magnetic recorder including a rectangular cabinet having a horizontal operating panel and vertically operated drive means for rotating a first pair of reels in a plane parallel to said operating panel, a pair of larger, supplementry reels rotatably connected to respective sides of the cabinet and adapted to alternative operation with said first pair of reels, a flexible connection maintained at an angle of substantially 90 degrees for effectively connecting said drive means to said supplementary reels, said supplementary reels being directly adjacent said cabinet sides and being rotatable in a plane perpendicular to said operating panel, and hinged side doors forming narrow end chambers having the same length and width dimensions as the sides of the cabinet for housing said supplementary reels at said cabinet sides, said supplementary reels occupying substantially the entire area of said narrow end chambers.

2. A device according to claim 1 and wherein said end chambers have an open top adjacent to said operating panel whereby magnetic tape may travel across said operating panel and through said open top to or from said supplementary reels, and inclined guide rollers adjacent to said openings for twisting running magnetic tape from a vertical to a horizontal position.

3. In a magnetic recorder including a rectangular cabinet having an operating panel and drive means for rotating and operating a first pair of reels in a plane parallel to said operating panel, a pair of larger, supplementary reels rotatably connected to respective sides of the cabinet and adapted to alternative operation with said first pair of reels, drive transmission means connecting said drive means to said supplementary reels, said supplementary reels being directly adjacent said cabinet sides and being rotatable in a plane perpendicular to said operating panel, and hinged side doors forming narrow end chambers having the same length and width dimensions as the sides of the cabinet for housing said supplementary reels at said cabinet sides, said supplementary reels occupying substantially the entire area of said narrow end chambers.

NATHAN M. HAYNES.

References Cited in the file of this patent

UNITED STATES PATENTS

| Number | Name | Date |
|---|---|---|
| 1,326,410 | McMillan | Dec. 30, 1919 |
| 1,372,621 | Hochstetter | Mar. 22, 1921 |
| 1,413,610 | Pittman | Apr. 25, 1922 |
| 2,029,730 | Malina | Feb. 4, 1936 |
| 2,084,947 | Czeija et al. | June 22, 1937 |
| 2,351,005 | Camras | June 13, 1944 |
| 2,501,055 | Hume | Mar. 21, 1950 |

FOREIGN PATENTS

| Number | Country | Date |
|---|---|---|
| 363,751 | Germany | July 20, 1919 |